(12) United States Patent
Yu et al.

(10) Patent No.: US 11,255,961 B2
(45) Date of Patent: Feb. 22, 2022

(54) RADAR SYSTEM FOR SCHOOL BUS

(71) Applicant: CUB ELECPARTS INC., Fuxing Township (TW)

(72) Inventors: San-Chuan Yu, Fuxing Township (TW); Shyh-Jong Chung, Fuxing Township (TW); Hong-Lun Chen, Fuxing Township (TW); Yu-Wang Hu, Fuxing Township (TW)

(73) Assignee: CUB ELECPARTS INC., Changhua County (TW)

(*) Notice: Subject to any disclaimer, the term of this patent is extended or adjusted under 35 U.S.C. 154(b) by 454 days.

(21) Appl. No.: 15/987,377

(22) Filed: May 23, 2018

(65) Prior Publication Data

US 2019/0310363 A1 Oct. 10, 2019

(30) Foreign Application Priority Data

Apr. 10, 2018 (TW) .................................. 107112315

(51) Int. Cl.
*G01S 13/931* (2020.01)
*G01S 13/04* (2006.01)

(52) U.S. Cl.
CPC ............ *G01S 13/931* (2013.01); *G01S 13/04* (2013.01); *G01S 2013/9315* (2020.01); *G01S 2013/93271* (2020.01); *G01S 2013/93272* (2020.01); *G01S 2013/93274* (2020.01)

(58) Field of Classification Search
None
See application file for complete search history.

(56) References Cited

U.S. PATENT DOCUMENTS

| | | | |
|---|---|---|---|
| 9,718,405 B1* | 8/2017 | Englander | ................. B60R 1/00 |
| 2005/0073433 A1* | 4/2005 | Gunderson | ............ B60Q 9/006 |
| | | | 340/903 |
| 2014/0191895 A1* | 7/2014 | Binzer | .................... G01S 13/02 |
| | | | 342/59 |

* cited by examiner

*Primary Examiner* — Whitney Moore
(74) *Attorney, Agent, or Firm* — Muncy, Geissler, Olds & Lowe, P.C.

(57) ABSTRACT

A school bus radar system includes a main unit mounted in the school bus, and two radars protrudingly arranged on the bus body of the school bus in a tilted manner and respectively electrically connected to the main unit. When the main unit is switched to a monitoring mode, the main unit generates a radar activation signal to activate the radars in generating a signal, making the signals generated by the monitoring sources of the radars form an intersection network. The monitoring source of each radar defines a normal line. Accordingly, the intersection type three-dimensional spatial monitoring network of the radar system of the present invention is proposed for individual warnings to facilitate the driver making good judgments or stopping the running school bus in an emergency.

7 Claims, 5 Drawing Sheets

RADAR SYSTEM FOR SCHOOL BUS

BACKGROUND OF THE INVENTION

1. Field of the Invention

The present invention relates to vehicle radar technology and more particularly, to a radar system practical for school bus application.

2. Description of the Related Art

A school bus is a type of bus regularly used to transport students to and from school or school-related activities. Due to the relatively large body size, when moving the school bus from the stop, the driver's line of sight can be blocked (the so-called visual dead angle), making the driver unable to prevent or respond to accidents in time.

For this reason, it is an object of the present invention as to how to install a radar system on a school bus and improve its parts for effectively solving the aforementioned problems.

SUMMARY OF THE INVENTION

The present invention has been accomplished under the circumstances in view. It is the main object of the present invention to provide a radar system for school bus, which provides an intersection type three-dimensional space monitoring network that facilitates the driver making better judgments or stopping the running school bus in an emergency.

To achieve this and other objects of the present invention, a radar system for use in a school bus comprises a main unit and a plurality of radars. The main unit is mounted in the school bus. The radars are protrudingly arranged on the bus body of the school bus in a tilted manner and respectively electrically connected to the main unit, each comprising a monitoring source. When the main unit is switched to a monitoring mode, the main unit generates a radar activation signal to activate the radars in generating a signal, making the signals generated by the monitoring sources of the radars form an intersection network. Further, the monitoring source of each radar defines a normal line, and the normal lines of the monitoring sources of the radars are intersected with each other to form an imaginary contained angle within the range of 30 degrees to 150 degrees.

Preferably, each radar defines with the ground a pitch angle within the range of 70 degrees to 110 degrees.

Preferably, the radars are arranged on one same long side of the bus body of the school body at the same height relative to the ground.

Preferably, the monitoring source of each radar generates a scan signal of 90 degrees angle.

Other advantages and features of the present invention will be fully understood by reference to the following specification in conjunction with the accompanying drawings, in which like reference signs denote like components of structure.

DETAILED DESCRIPTION OF THE INVENTION

Figure 1:
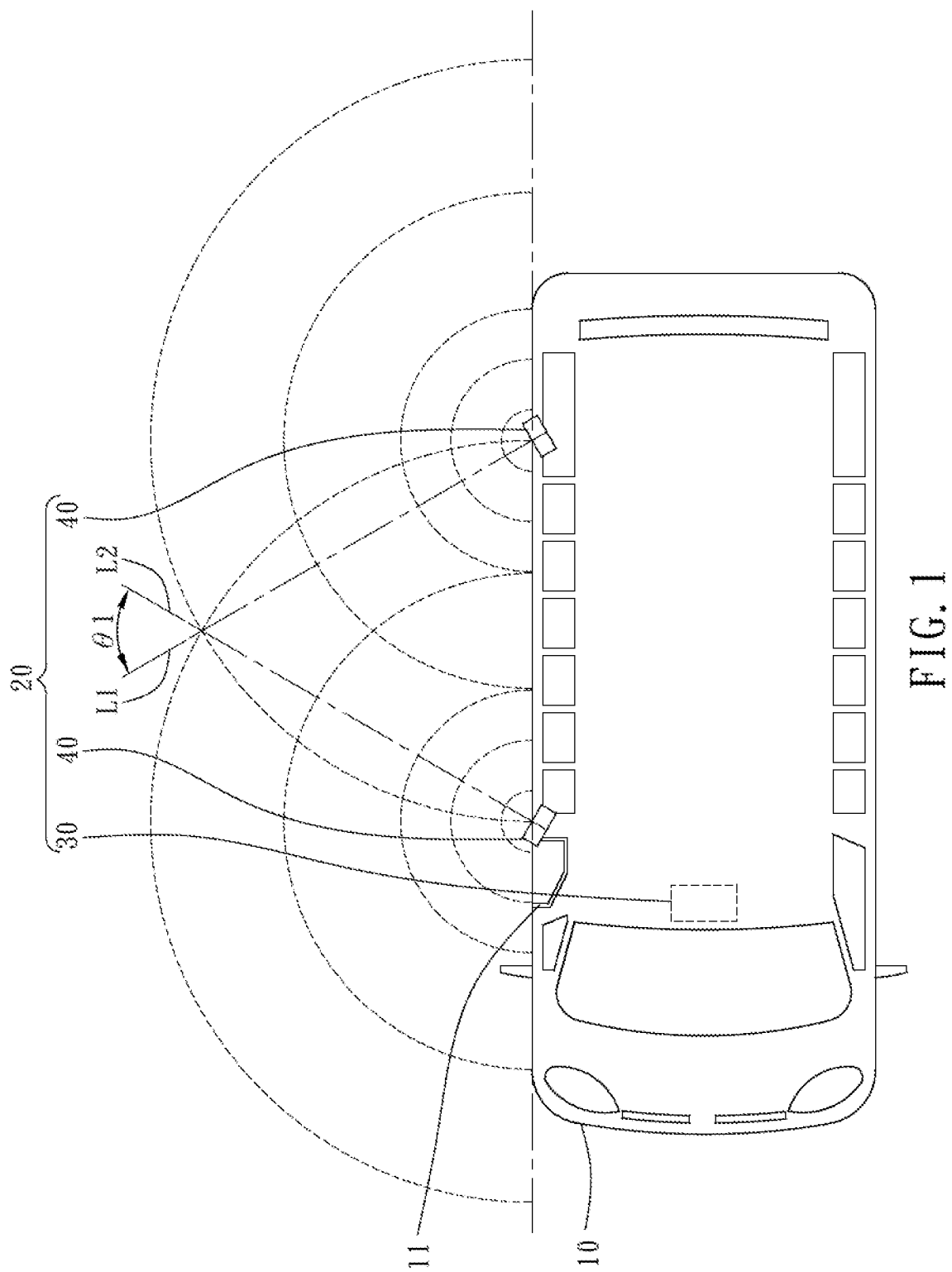
FIG. 1 is a schematic top applied view of a radar system in a school bus in accordance with a first embodiment of the present invention.
Figure 2:
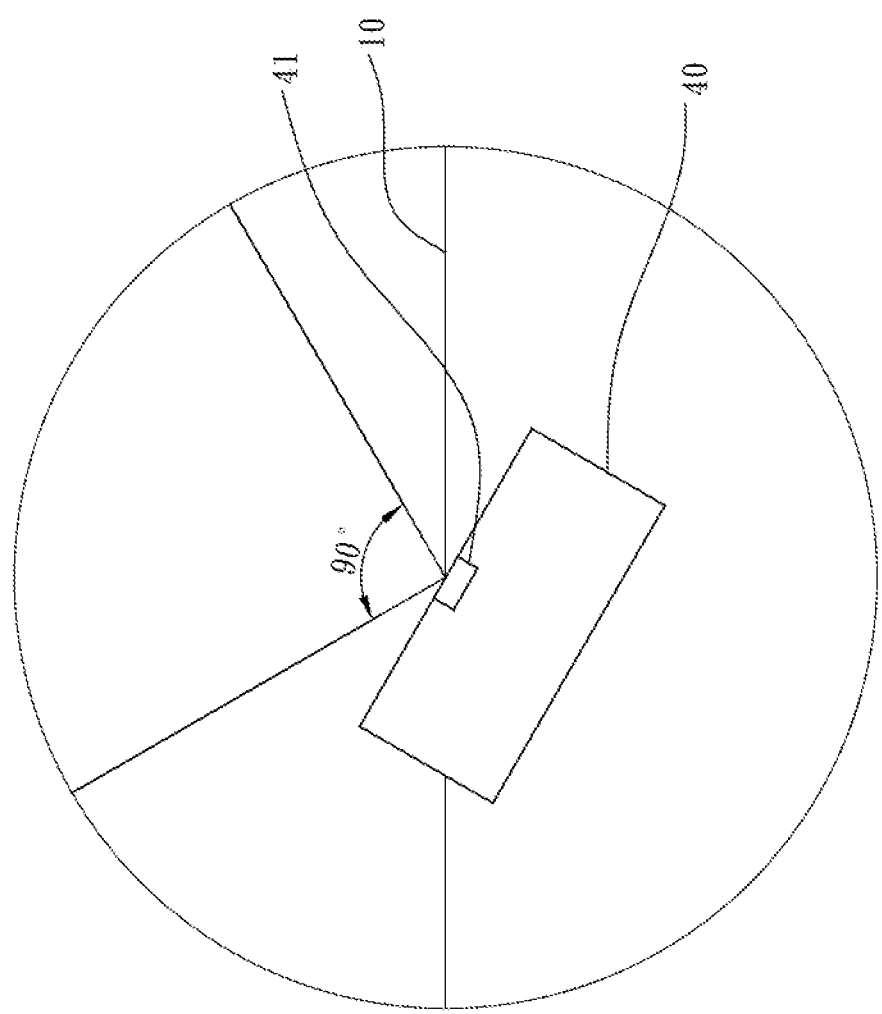
FIG. 2 is a schematic drawing illustrating the mounting angle of the monitoring source of the radar relative to the school bus.
Figure 3:
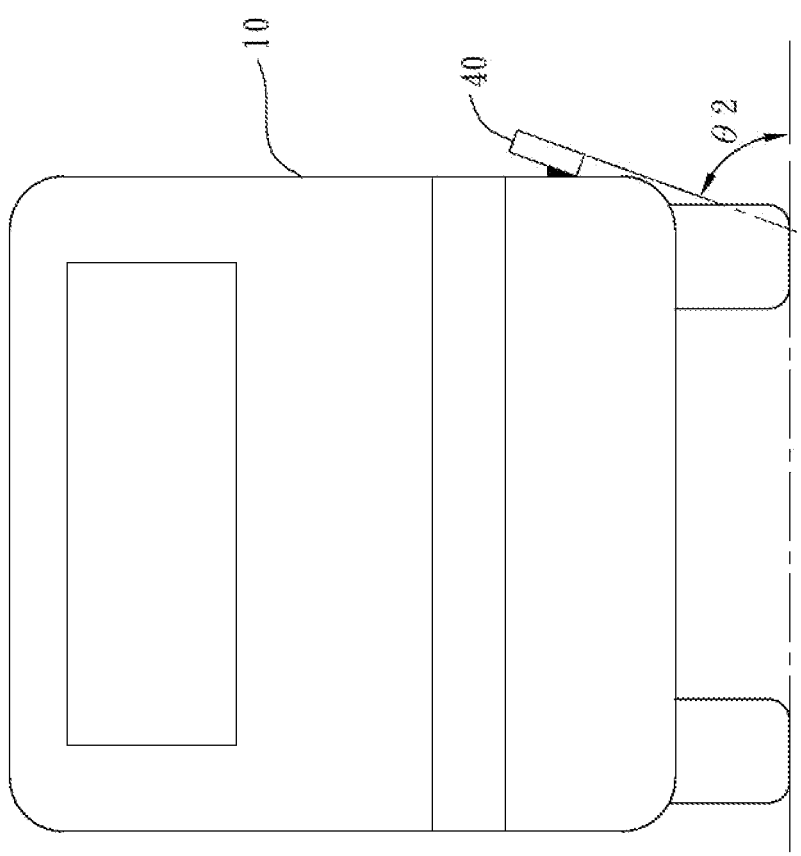
FIG. 3 is a rear side view illustrating the pitch angle between the radar on the school bus and the ground.

Referring to FIG. 1, FIG. 2, and FIG. 3, a radar system 20 in accordance with a first embodiment of the present invention is adapted for use in a school bus 20. The radar system 20 comprises a main unit 30 and two radars 40.

The main unit 30 is installed in a school bus 10.

The two radars 40 are respectively and protrudingly arranged on one same long side of the school bus 10 in which a door 11 is provided. Preferably, the two radars 40 are arranged on the same long side of the school bus 10 at the same height relative to the ground. The two radars 40 are respectively electrically connected to the main unit 30, each comprising a planar unidirectional monitoring source 41.

It is worth mentioning that the long side of the school bus 10 is used as a reference plane, and any one of the radars 40 forms a tilt angle (not shown) with the long side of the school bus 10, thus, the normal fines $L_1$, $L_2$ of the monitoring sources 41 of the radars 40 extend in a direction away from the long side of the school bus 10 and then intersect with each other to form an imaginary contained angle $\theta_1$. Further, any one of the radars 40 defines with the ground a pitch angle $\theta_2$.

According to the radar system 20 disclosed in the first preferred embodiment of the present invention, the desired effect is as follows:

1. With individual warnings to facilitate the driver to determine the monitoring effect. Referring to FIG. 1, when the main unit 30 is switched to a monitoring mode (not shown), a radar activation signal is generated and respectively transmitted to the two radars 40 to activate the two radars 40, at this time, the signal generated by the monitoring source 41 of each radar 40 can be used to monitor whether there is any human or foreign object covered or shaded. In case the monitoring source 41 of the radar 40 is covered or shaded by a human or foreign object, the respective radar 40 sends a warning signal back to the main unit 30, thus, the driver can use the alert (buzzer or warning light) generated by the main unit 30 to judge the presence of a person or foreign object around the periphery of the school bus 10, so as to pay more attention and to effectively prevent the occurrence of accidents.

2. Intersection type three-dimensional space monitoring network for emergency stop of the school bus. As described above, the radars 40 are arranged on the long side of the school bus 10 in a tilted relationship with the normal lines $L_1$, $L_2$ of the monitoring sources 41 of the radars 40 extending in a direction away from the long side of the school bus 10 and intersected with each other to form an imaginary contained angle $\theta_1$. The imaginary contained angle $\theta_1$ is between 30 degrees and 150 degrees, and the region covered by the imaginary contained angle $\theta_1$ is defined as a first imaginary region. Further, see also FIG. 3, the pitch angle $\theta_2$ defined between any one of the radars 40 and the ground is between 70 degrees and 110 degrees, and the region covered by the pitch angle $\theta_2$ is defined as a second imaginary region. Therefore, based on the intersection between the first imaginary region and the second imaginary region defined by the two radars 40, a three-dimensional space monitoring network is formed.

Therefore, if there is any human or foreign object covered or shaded by the three-dimensional space monitoring network formed of the monitoring sources 41 of the two radars 40, a corresponding emergency signal will be generated and sent back to the min unit 30, causing the main unit 30 to generate an alert (buzzer or warning light) according to the emergency signal; then, the driver immediately stops the movement of the school bus 10 according to the alert generated by the main unit 30 and can continue to move the school bus 10 only after the human or foreign object moves away from the three-dimensional space monitoring network, preventing occurrence of serious accidents. It's worth mentioning that the imaginary contained angle $\theta_1$ defined by the intersection between the normal lines $L_1$, $L_2$ of the monitoring sources 41 of the radars 40 is preferably between 50 degrees and 130 degrees, and the pitch angle $\theta_2$ defined between any one of the radars 40 and the ground is preferably between 80 degrees and 100 degrees. More preferably, the optimal range of the scan signal generated by any of the monitoring sources 41 of the radars 40 is 90 degrees.

Figure 4:
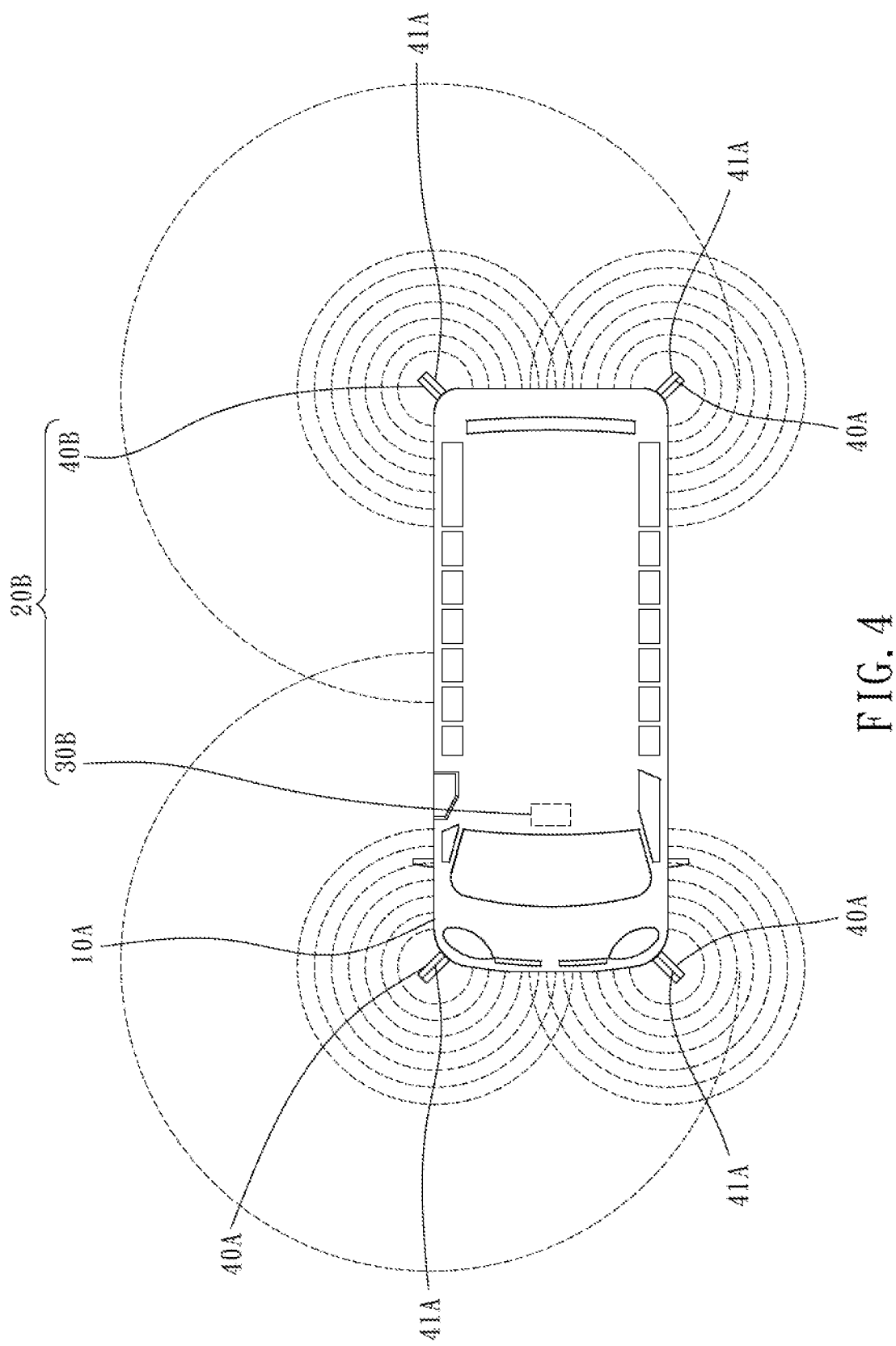
FIG. 4 is a schematic top applied view of a radar system in a school bus in accordance with a second embodiment of the present invention.

Referring to FIG. 4, a radar system 20A for installation in a school bus 10A in accordance with a second embodiment of the present invention is shown. The radar system 20A of this second embodiment is substantially similar to the aforesaid first embodiment, comprising a main unit 30A mounted in the school bus 10A and four radars 40A arranged on the school bus 10A.

The radars 40A are respectively electrically connected to the main unit 30A, and respectively and protrudingly arranged on the junction between each two adjacent sides of the school bus 10A; each comprising a curved surface multi-directional monitoring source 41A, which means that the range of the scan signal generated by the monitoring source 41A of any one of the radars 40A is between 5 degrees and 355 degrees.

Figure 5:
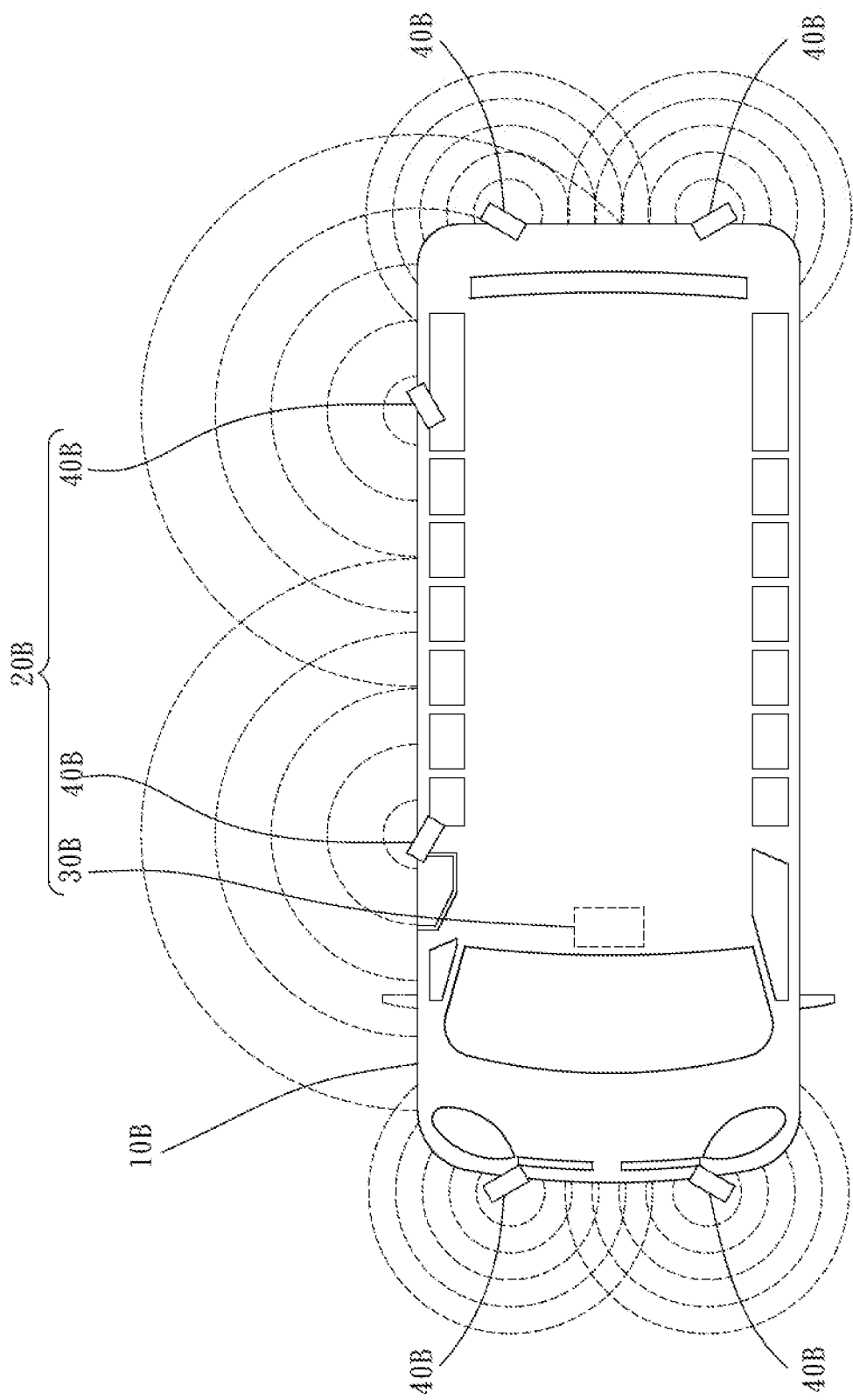
FIG. 5 is a schematic top applied view of a radar system in a school bus in accordance with a third embodiment of the present invention.

Referring to FIG. 5, a radar system 20B for installation in a school bus 10B in accordance with a third embodiment of the present invention is shown. The radar system 20B of this third embodiment is substantially similar to the aforesaid first embodiment, comprising a main unit 30B mounted in the school bus 10B and six radars 40B arranged on the school bus 10B.

These radars 40B are respectively electrically connected to the main unit 30B, wherein two of the radars 40B are protrudingly arranged on one same long side of the school bus 10B, another two of the radars 40B are protrudingly arranged on a front side of the school bus 10B, and the other two radars 40B are protrudingly arranged on an opposing rear side of the school bus 10B.

Finally, it must be stated again that those of ordinary persons skilled in the art to which the present invention pertains should be able to clearly understand that the detailed description and the embodiments of the present invention are for explaining the structure, method and flow of the present invention but not intended to limit the scope of the invention of the present invention, other equivalent elements, components, objects, structures, devices, methods or processes may be made without departing from the spirit and scope of the present invention.

What is claimed is:

1. A radar system used in a school bus, comprising:
a main unit mounted in said school bus; and
a plurality of radars arranged on a bus body of said school bus and respectively electrically connected to said main unit, each said radar comprising a monitoring source defined with a normal line;
wherein each of said plurality of radars is protruded from two ends of each long side of said bus body and is tilted toward said bus body and a ground, and said normal lines of said monitoring sources are intersected with each other to form an imaginary contained angle within the range of 30 degrees to 150 degrees, and each said radar defines with the ground a pitch angle within the range of 70 degrees to 110 degrees; and
wherein said radar system comprises a three-dimensional intersection network formed by said plurality of radars based on said imaginary contained angles and said pitch angles when said main unit is switched to a monitoring mode, and in said monitoring mode, said main unit generates a radar activation signal to said radars to activate said radars in generating a signal, making the signals generated by the said monitoring sources of said radars form said three-dimensional intersection network that covers blind zones around each long side of said bus body.

2. The radar system as claimed in claim 1, wherein the number of said radar is 4, and these said radars are respectively protrudingly arranged on the junction between each two adjacent sides of said bus body of said school bus.

3. The radar system as claimed in claim 2, wherein two said radars are arranged on one same long side of said bus body of said school body at the same height relative to the ground.

4. The radar system as claimed in claim 1, wherein the number of said radar is 6 with two said radars respectively protrudingly arranged on one long side of said bus body of said school bus, two other said radars respectively protrudingly arranged on a front side of said bus body of said school bus, and the other two said radars respectively protrudingly arranged on an opposing rear side of said bus body of said school bus.

5. The radar system as claimed in claim 4, wherein two said radars are arranged on one same long side of said bus body of said school body at the same height relative to the ground.

6. The radar system as claimed in claim 1, wherein two said radars are arranged on one same long side of said bus body of said school body at the same height relative to the ground.

7. The radar system as claimed in claim 1, wherein the said monitoring source of each said radar generates a scan signal of 90 degrees angle.

* * * * *